United States Patent [19]

Inaba et al.

[11] Patent Number: 4,562,551
[45] Date of Patent: Dec. 31, 1985

[54] ROBOT CONTROL SYSTEM

[75] Inventors: Hajimu Inaba, Hino; Shinsuke Sakakibara, Kunitachi; Ryo Nihei, Musashino, all of Japan

[73] Assignee: Fanuc Limited, Minamitsuru, Japan

[21] Appl. No.: 414,355

[22] PCT Filed: Dec. 16, 1981

[86] PCT No.: PCT/JP81/00383

§ 371 Date: Aug. 26, 1982

§ 102(e) Date: Aug. 26, 1982

[87] PCT Pub. No.: WO82/02437

PCT Pub. Date: Jul. 22, 1982

[30] Foreign Application Priority Data

Dec. 30, 1980 [JP] Japan ............................ 55-186748

[51] Int. Cl.$^4$ .......................... G05B 19/00; B25J 9/00; B25J 13/00
[52] U.S. Cl. .................................... 364/513; 364/192; 364/478; 318/568; 414/730; 414/735; 901/9; 901/33; 901/34; 901/46; 901/47
[58] Field of Search ............... 364/513, 192, 170, 478; 901/9-13, 30-35, 44-47, 49; 318/568; 414/730, 735, 750

[56] References Cited

U.S. PATENT DOCUMENTS

| Re. 30,016 | 5/1979 | Hohn | 364/513 X |
|---|---|---|---|
| 3,306,471 | 2/1967 | Devol | 214/1 |
| 3,770,140 | 12/1973 | Dukette | 901/40 X |
| 3,804,270 | 4/1974 | Michaud et al. | 901/47 X |
| 3,943,343 | 3/1976 | Irie | 364/513 X |
| 4,001,556 | 1/1977 | Folchi et al. | 364/513 |
| 4,017,721 | 4/1977 | Michaud | 364/513 |
| 4,024,959 | 5/1977 | Gruner | 414/751 |
| 4,025,838 | 5/1977 | Watanabe | 364/513 |
| 4,140,953 | 2/1979 | Dunne | 318/568 |
| 4,166,543 | 9/1979 | Dahlstrom | 901/9 X |
| 4,170,751 | 10/1979 | Stricker | 901/46 X |
| 4,178,632 | 12/1979 | Anthony | 901/9 X |
| 4,287,459 | 9/1981 | Dahlstrom | 901/9 X |
| 4,305,130 | 12/1981 | Kelley et al. | 901/9 X |
| 4,374,349 | 2/1983 | Inaba et al. | 901/9 X |
| 4,401,945 | 8/1983 | Juengel | 901/10 X |
| 4,402,053 | 8/1983 | Kelley et al. | 364/513 |
| 4,403,281 | 9/1983 | Holmes et al. | 414/730 |
| 4,433,382 | 2/1984 | Cunningham et al. | 364/474 |

OTHER PUBLICATIONS

Supplementary European Search Report, 8-15-83 by Examiner Ressenaar at The Hague.

*Primary Examiner*—Jerry Smith
*Assistant Examiner*—Allen MacDonald
*Attorney, Agent, or Firm*—Staas & Halsey

[57] ABSTRACT

A hand of a robot is moved from an instant position $P_1$ to a first command position $P_2$ to grip one of the workpieces $W_1$, $W_2$, $W_3$ placed at the first command position and conveys the same to a second command position $P_3$. As a sensor is contacted by the workpiece when the hand takes an intermediate position $P_x$, on its way from the instant position $P_1$ to the first command position $P_2$, the robot control system decelerates the hand without delay or after a travel of the hand over a predetermined distance and, after travel of the hand over a predetermined deceleration distance, stops the hand. The hand is then moved from the stopping position to the second command position $P_3$ neglecting the remaining stroke or movement between the stopping position and the first command position.

3 Claims, 9 Drawing Figures

ROBOT CONTROL SYSTEM

CROSS REFERENCES TO RELATED APPLICATIONS

This application is related to U.S. application Ser. No. 414,366, filed Aug. 26, 1982 which is assigned to the assignee of the present invention.

BACKGROUND OF THE INVENTION

The present invention relates to a robot control system and, more particularly, to a robot control system which makes it possible to grip a workpiece without fail even if the workpiece is somewhat offset from the correct position, and which permits easy teaching for gripping and unloading of the workpiece on a work table, as well as a smooth stopping of the hand when the latter has approached the workpiece.

BACKGROUND ART

Playback-tape industrial robots have been put into practical use and are fully exhibiting their ability, well satisfying the demand for saving labor and procedural simplification of work in view of the current rise in labor cost. Particularly, in machine factories in which many machine tools are installed, a remarkable effect has been achieved by employing the playback type industrial robot for simple services such as exchange of workpieces, exchange of tools and so forth for each of the machine tools. Under these circumstances, the demand for the playback type industrial robot is increasing year by year.

In the actual use of the playback type industrial robot, instructions for the services to be performed by the robot are applied beforehand to the robot through a teaching box and the content of the instructions (referred to as "robot command data" hereinafter) is stored in a memory incorporated in the controller. A series of robot command data is read each time the service demand is raised by the machine to make the robot repeatedly serve the machine.

The robot command data is composed of the information concerning the point to be served, operation speed, and a service code which commands control of the hand at the service point, exchange of signals between the machine and the control system and so forth. The above-mentioned teaching generally includes the following steps: namely, (1) setting a memory address where the robot data is to be stored, (2) positioning by a jog feed (manual feed), (3) setting of point position information and speed command and (4) setting of robot service code. The instruction for a series of robot services are made by repeating the sequence including the above-mentioned steps (1) to (4). Therefore, the robot performs correctly and successively various tasks such as exchange of workpieces, removal of metal scraps, exchange of tools, control of the hand and so forth, after completion of positioning at a predetermined speed, in accordance with the robot command data each time the service demand is issued, unless any impediment exists in the mechanical portion.

If a workpiece is positioned at a slight offset from the correct position, the hand cannot grip the workpiece securely even if it is moved correctly to the commanded position as instructed. In a case where a multiplicity of unmachined workpieces are stacked on the work table, the position of gripping varies depending on the size, dimensions, etc. of the workpiece, so that it is necessary to take the trouble of renewing the position command each time a workpiece is gripped. When the machined workpieces are stacked, the position at which the hand releases the workpiece varies depending on the desired location of the workpiece, so that it becomes necessary to take the trouble of renewing the position command for releasing the workpiece each time the release takes place.

SUMMARY OF THE INVENTION

Accordingly, it is an object of the invention to provide a robot control system which can securely grip a workpiece even if the workpiece is somewhat misaligned from the correct position and which permits easy teaching of the gripping and unloading of workpieces stacked on a work table.

It is another object of the invention to provide a robot control system which can automatically decelerate the hand to smoothly stop the same when it has approached a workpiece.

More specifically, according to the invention, there is provided a robot control system in which a robot service is stored beforehand in the data memory of a robot control system and the robot performs the service in accordance with the stored data. When the hand of the robot is moved from a present or instant position $P_1$ to a first command position $P_2$ to effect the service on an object stationed at the first command position $P_2$ and, thereafter, the hand is moved to a second command position $P_3$, a sensor senses a predetermined signal which limits the motion of the robot while the hand is moving from the instant position $P_1$ to the first command position $P_2$, deceleration of the hand is commenced without delay and, after travel of the hand over a predetermined deceleration distance under deceleration, the hand is stopped. Alternatively, deceleration is commenced after travel of the hand over a predetermined transit distance subsequent to the generation of the aforementioned signal, and the hand is stopped after travel of the hand over a predetermined deceleration distance under deceleration. Then, the robot executes the robot service as instructed at the position where the hand is stopped. Thereafter, the hand is moved to the second command position $P_3$ neglecting or ignoring the remaining stroke or movement to the first command position $P_2$.

According to the invention, therefore, it is possible to stop the hand gently and smoothly after it is has approached the object to be handled by the robot. In addition, after the completion of a robot service, the robot can get ready for the next operation. Furthermore, the teaching of a series of robot operations is very much simplified.

DESCRIPTION OF THE PREFERRED EMBODIMENTS

To go into further detail of the invention, preferred embodiments of the invention will be described hereinunder with reference to the accompanying drawings.

Figure 1:
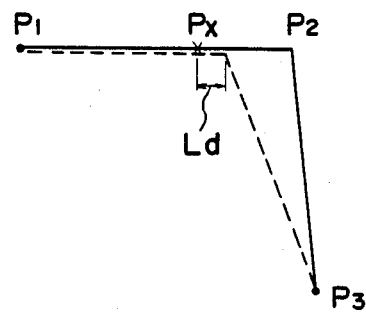
FIGS. 1 and 2 are motion diagrams used to explain a robot control system in accordance with the invention.
Figure 2:
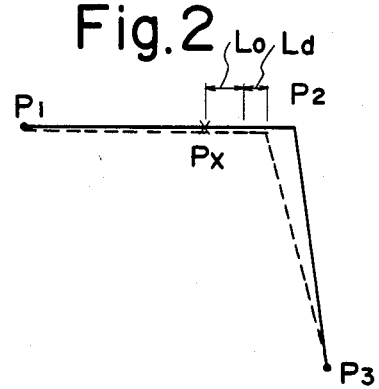
Figure 3:
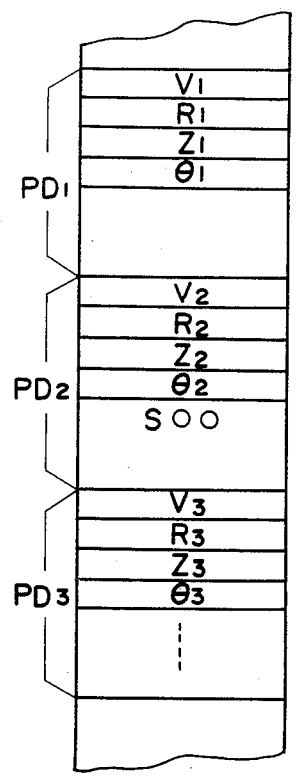
FIG. 3 is an example of the robot command data.
Figure 7:
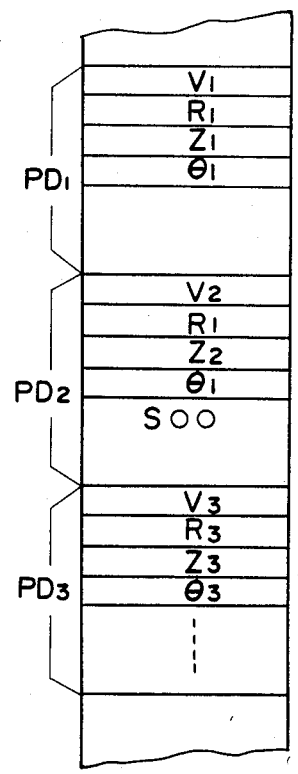
FIG. 7 is an illustration of the robot command data.

FIGS. 1 and 2 are illustrations explanatory of the robot control system of the invention, while FIG. 3 is an illustration of an example of robot command data.

Assume here that robot command data has been formed or generated which will move the robot hand from the instant position $P_1$ to a first command position $P_2$ where it grips an unmachined workpiece and then to a second command position $P_3$ as shown in FIGS. 1 or 2. The robot operates in accordance with cylindrical coordinates having R, Z and $\theta$ axes. The coordinates of the positions $P_1, P_2$ and $P_3$ are represented, respectively, by $(R_1, Z_1, \theta_1), (R_2, Z_2, \theta_1)$ and $(R_3, Z_3, \theta_3)$. The speed of movement from a point $P_0$ (not shown) to the instant position $P_1$ is represented by $V_1$. Similarly, the speeds of movement from the position $P_1$ to the position $P_2$ and from the position $P_2$ to the position $P_3$ are represented by $V_2$ and $V_3'$ respectively. The code of robot service for gripping the workpiece is represented by S00. The hand is equipped with a sensor which is adapted to produce a sensing signal upon contact with the workpiece.

As shown in FIG. 3, the robot command data comprises point data $PD_1, PD_2, PD_3, \ldots$ at the points $P_1, P_2, P_3, \ldots$. For moving the arm from the instant position $P_1$ to the first command position $P_2$, the point data $PD_2$ is read out from the data memory, and the arm is moved to the first command position $P_2$ in accordance with the motion speed data and position data $V_2, R_2, Z_2, \theta_2$ contained by the point data $PD_2$. As the hand reaches the first command position $P_2$, it grips the workpiece in accordance with the robot command data S00 contained by the point data $PD_2$. After the completion of gripping of the workpiece by the hand, position data $V_3, R_3, Z_3, \theta_3$ is read from the point data $PD_3'$ so that the hand starts to leave for the second command position $P_3$.

In the described embodiment of the invention, during the movement of the hand from the position $P_1$ to the position $P_2$, the robot control system starts to automatically decelerate the hand immediately after the sensor is contacted by the workpiece (at point Px shown in FIGS. 1 and 2) and the hand is stopped after travelling over a deceleration distance Ld while being decelerated (See FIG. 1). Alternatively, the automatic deceleration is commenced after travel of the hand over a predetermined transit distance Lo and then the hand is stopped after travelling the deceleration distance Ld (See FIG. 2). Then, the robot command data S00 contained by the point data $PD_2$ is read from the data memory to make the hand grip the workpiece. After the completion of the gripping operation, the hand is directly moved to the second command position $P_3$, neglecting the remaining stroke or movement to the first command position $P_2$. Thus, in the robot control system of the invention, if the unmachined workpiece is positioned at an offset from the correct position towards the starting position $P_1$, the hand is decelerated without delay after the workpiece is sensed by the sensor and is then stopped or, alternatively, the automatic deceleration is commenced after the travel to a position (distance Lo) where the hand can perfectly grip the workpiece, the distance being determined in accordance with the position of the sensor, and then the hand is stopped.

FIGS. 4, 5, 6 and 7 illustrate a practical application of the present invention. In this application, unmachined workpieces $W_1$ to $W_3$ are stacked on a work table WT (See FIG. 4) and are gripped and conveyed to the point $P_3$ successively one at a time. In this application, the data concerning the position of the unmachined workpieces $W_1, W_2$ and $W_3$ in the direction of the Z axis is determined to be somewhat deeper, i.e. farther, than the actual one. More specifically, the unmachined works $W_1, W_2$ and $W_3$ have different positions in the direction of the Z axis. According to the invention, the Z-axis position of the lowermost unmachined workpiece $W_3$ (or a position below the lowermost workpiece) is used as the Z-axis position data in the point data $PD_2$ (See FIG. 7). During operation, for conveying the first unmachined workpiece $W_1$ to the point $P_3$, automatic deceleration is commenced immediately after the sensor attached to the hand contacts the unmachined workpiece $W_1$ and the hand is stopped after travelling the deceleration distance Ld (See FIG. 5) or, alternatively, the hand is moved after the contact with a position where it can perfectly grip the unmachined workpiece $W_1$, i.e. the hand travels the distance Lo, and is then automatically decelerated and stopped (See FIG. 6). Then, the robot service code S00 is read out to make the hand grip the unmachined workpiece $W_1$, and the hand is moved to the second command position $P_3$ in accordance with the point data $PD_3$. The distance Lo is determined in accordance with the position of the sensor on the hand taking into account the deceleration distance Ld, such that gripping can be made perfectly for all of the unmachined workpieces $W_1$ to $W_3$.

The conveyance of the unmachined workpieces $W_2$ and $W_3$ can be made in the same manner as explained above, using the same point data $PD_1$ to $PD_3$ as those used for the first unmachined workpieces $W_1$. Thus, the unmachined workpiece $W_1$ to $W_3$ are successively gripped one by one by a series of robot command data in which the position command is determined to be somewhat greater than the actual one.

Figure 8:
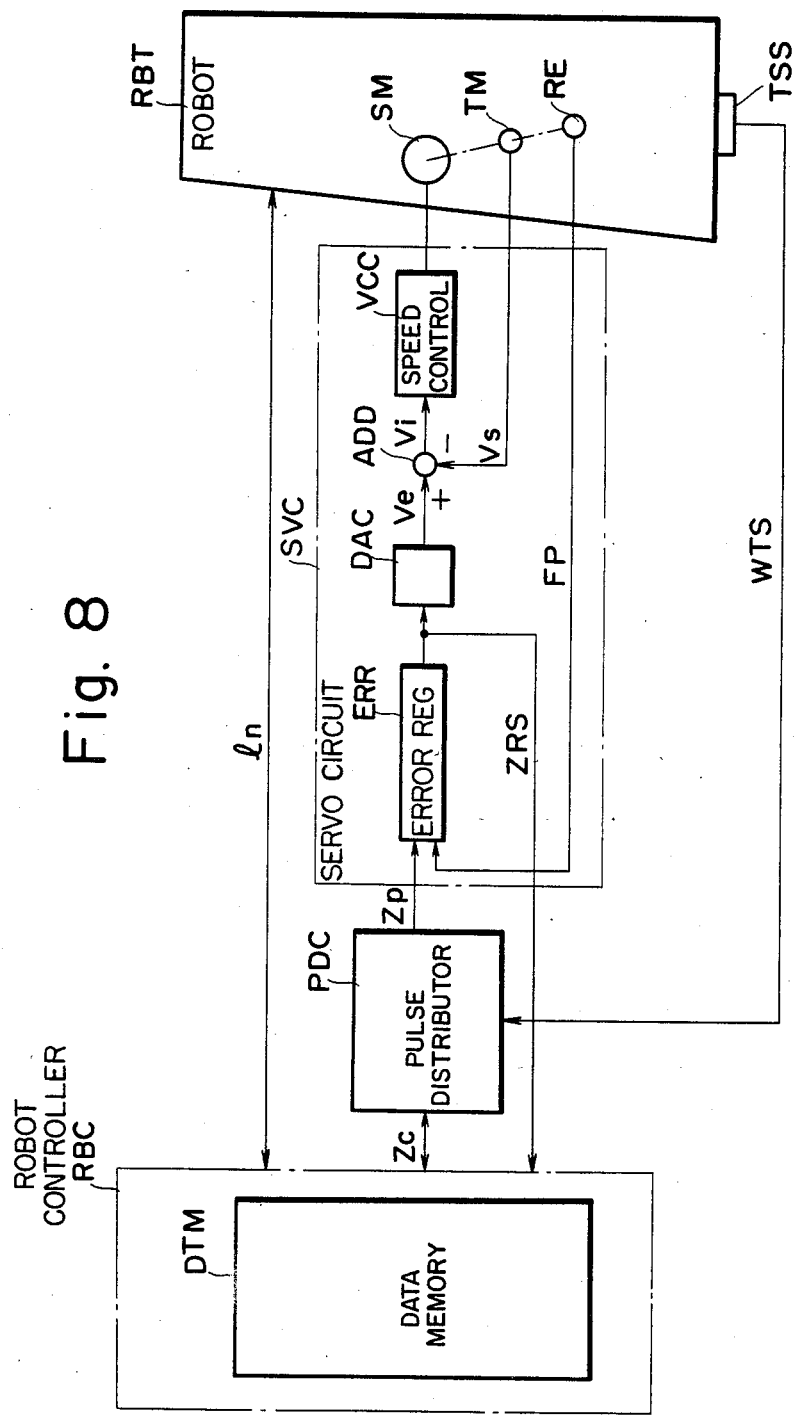
FIGS. 8 and 9 are block diagrams of different embodiments of the invention.

FIG. 8 shows a block diagram of an embodiment of the invention. Referring to FIG. 8, a robot controller RBC incorporates a data memory DTM. This data memory DTM stores the robot command data shown in FIG. 3 or 7. A pulse distributor PDC performs a pulse distribution calculation in accordance with the position command data Zc and distributes pulses Zp. A symbol SVC represents a servo circuit for the Z axis. FIG. 8 shows only the pulse distributor PDC and servo circuit SVC for the Z axis, while the pulse distributors and servo circuits for the R and $\theta$ axes are omitted for simplicity. An error register ERR is adapted to count up or count down the distribution pulses Zp, as well as a feedback pulse Fp which is generated each time the shaft of a motor SM for Z-axis driving rotates a predetermined amount, in accordance with the direction of movement, and stores the difference between the commanded pulse number and the number of the feedback pulses, i.e. the positional offset. Namely, if the commanded direction of movement is the positive direction, the error register ERR counts up the command pulses Zp each time the command pulse Zp is generated, whereas, if the commanded moving direction is the negative direction, the error register ERR counts down the command pulses Zp. As to the feedback pulses Fp, the error register ERR counts down and counts up when the moving direction is positive and negative, respectively. A digital-to-analog converter DAC (referred to as DA converter, hereinunder) is adapted to output an analog positional offset voltage Ve proportional to the positional offset. The servomotor SM is adapted to drive the robot in the direction of the Z axis. The servomotor Sm is composed of, for example, a DC motor. A position sensor RE such as rotary encoder, resolver or the like is adapted to produce one feedback pulse Fp each time the servomotor SM performs a predetermined amount of rotation. A reference symbol TM represents a tachometer adapted to produce and deliver an actual speed voltage Vs proportional to the motor speed. An operation section ADD calculates the difference between the positional offset voltage Ve and the actual speed voltage Vs, while a speed control circuit VCC is adapted to control the speed of the servomotor SM to nullify the offset voltage Vi. A robot RBT has a hand to the end of which is attached a sensor TSS.

Figure 4:
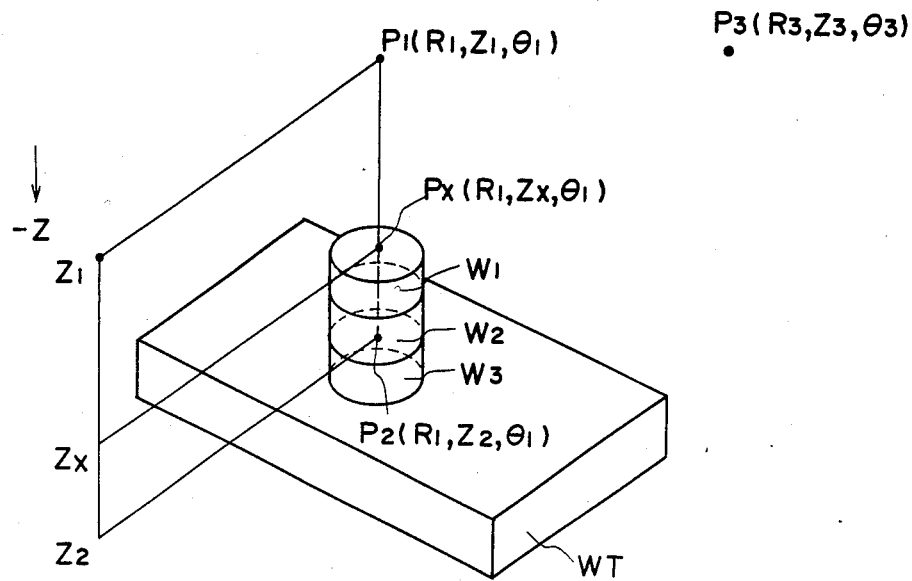
FIGS. 4, 5 and 6 are illustrations of the system of the invention applied to a case where a multiplicity of unmachined workpieces are stacked on a work table.
Figure 5:
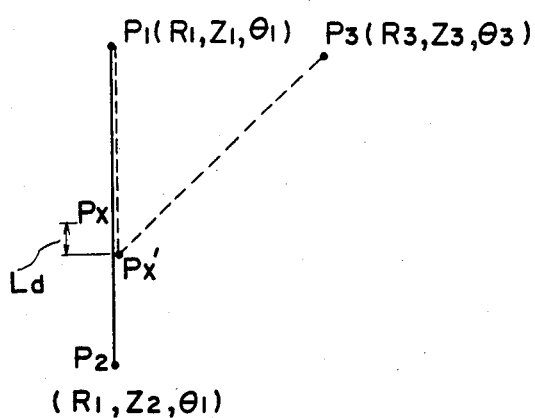
Figure 6:
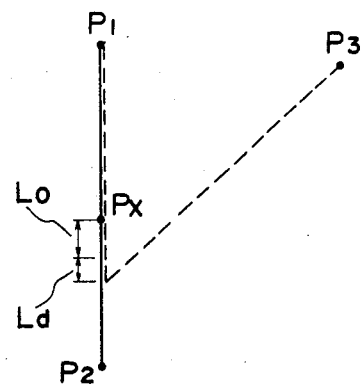

The operation of each section of the system for executing the service shown in FIG. 4 will be described hereinunder.

The robot controller RBC reads out the motion speed data and position data $V_2, R_1, Z_2, O_1$ contained by the point data $PD_2$ (See FIG. 7) from the data memory DTM incorporated therein, and calculates the incremental values R, Z and $\theta$ for respective axes. In the case of the service shown in FIG. 4, the incremental values $R_1$ and $O_1$ are zero. The calculated incremental value Z is fed to the pulse distributor PDC as the position command Zc. The pulse distributor then performs the pulse distribution calculation to deliver distribution pulses Zp. The error register ERR counts up or down the distribution pulses in accordance with the direction of the movement. In the case of the service shown in FIG. 4, 1 (one) is subtracted from the content of the error register ERR each time the distribution pulse Zp is produced, because the direction of movement is negative, i.e. $-Z$. The content of the error register is converted into a positional offset voltage Ve by the DA converter DAC, and is compared with the actual speed voltage Vs in the operation section ADD. The servomotor SM is operated rotationally in accordance with the difference. In consequence, the hand (not shown) of the robot RBT is moved in the direction $-Z$, i.e. towards the unmachined workpiece $W_1$. During the rotation of the servomotor SM, one feedback pulse Fp is produced each time a predetermined amount of rotation is reached. The feedback pulse Fp is delivered to the error register ERR to count up the content of the latter. Thereafter, each section of the system operates in the manner explained before so that the hand continues to approach the unmachined workpiece $W_1$. Then, as the sensor TSS attached to the end of the hand contacts the unmachined workpiece $W_1$, the sensor TSS produces a workpiece contact or position signal WTS which in turn is fed to the pulse distributor PDC to stop the pulse distribution. In this state, the command pulse Zp is no longer applied to the error register ERR, so that the content of the error register ERR is gradually decreased. At the same time, the positional offset voltage Ve and, hence, the difference voltage Vi are decreased to decelerate the servomotor SM. Then, as the number of the feedback pulse reaches a value corresponding to the positional offset stored in the error register ERR, the content of the error register ERR is nullified so that the hand is stopped. In other words, the hand stops after travelling the deceleration distance Ld corresponding to the number of pulses stored in the error register at the time the work contact signal WTS is generated. Then, when the content of the error register ERR is reduced to zero, a zero signal ZRS is applied to the robot control system RBC. The robot control system RBC regards this zero signal as a signal representing the compeletion of the positioning of the hand at the point $P_2$, and reads the robot service code S00, for the gripping of a workpiece from the data memory DTM. This robot service code S00 is delivered to the robot RBT through a line $1_n$ so that the RBT grips the unmachined workpiece $W_1$. Then, the robot service completion signal is sent to the robot control system which then reads the motion speed data and position data $V_3, R_3, Z_3, O_3$ contained by the point data $PD_3$ (See FIG. 7) from the data memory DTM. The pulse distribution calculation for respective axes is performed in accordance with these data and the hand is moved from the stopping position Px' towards the point $P_3$ (See FIG. 5). The remaining stroke between the stopping Px' and the first command position $P_2$ is neglected.

Figure 9:
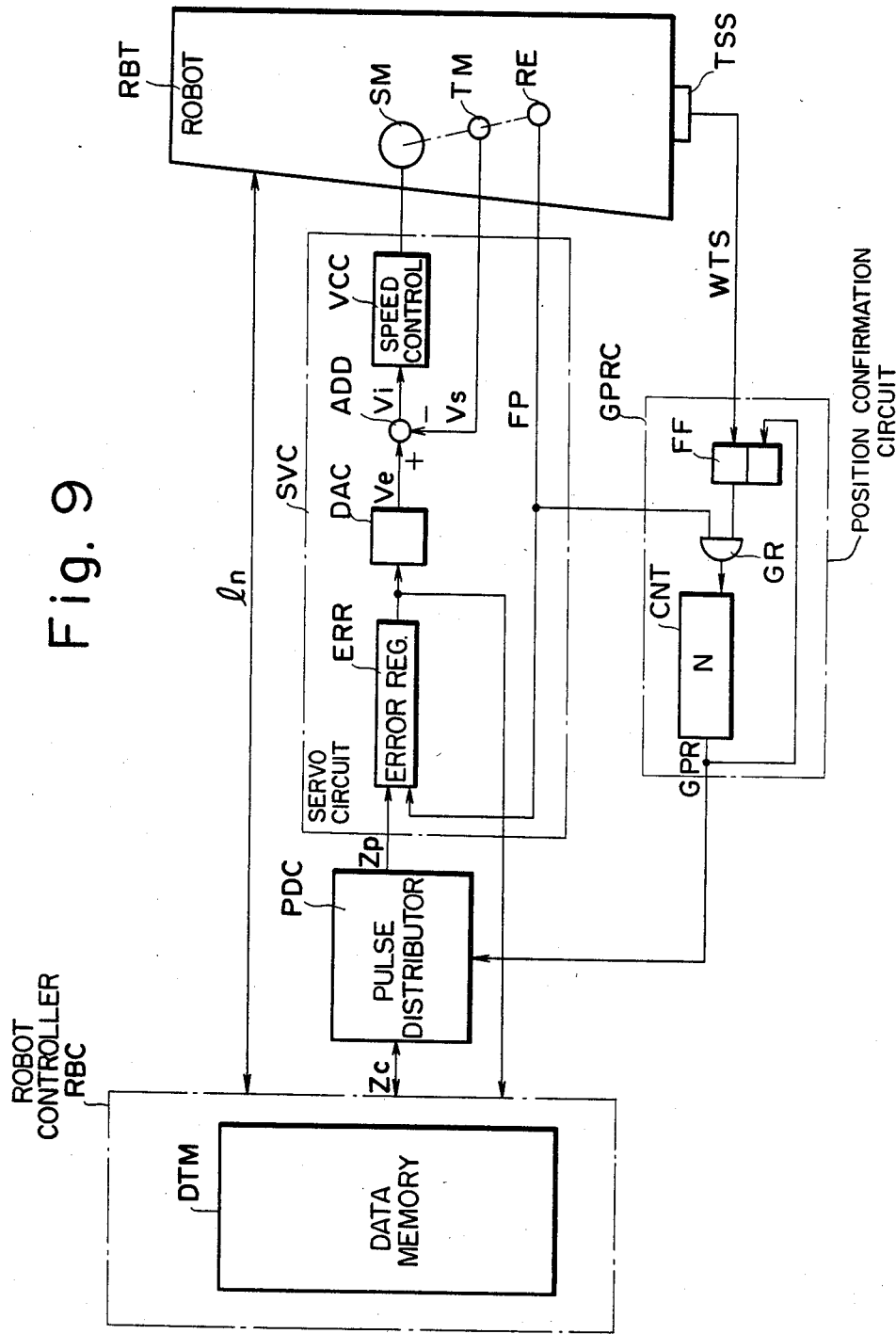

FIG. 9 shows a block diagram of another embodiment of the invention. In this embodiment, the hand is made to travel a predetermined distance Lo after the generation of the workpiece contact signal WTS, and is then stopped through an automatic deceleration. In FIG. 9, the same reference numerals are used to denote the same parts or members as those used in FIG. 8.

The embodiment shown in FIG. 9 differs from the embodiment shown in FIG. 8 by the following feature. Namely, in this embodiment, a gripping position arrival signal GPR is produced after the generation of a predetermined number of feedback pulses Fp following the workpiece contact signal WTS, and the pulse distribution calculation is stopped as the gripping position arrival signal GPR is produced.

In FIG. 9, GPRC represents a gripping position arrival confirmation circuit adapted to produce the gripping position arrival signal GPR. This circuit has a reversible counter CNT, AND gate GR and a flip-flop FF. The number N corresponding to the distance Lo is present or set in the reversible counter CNT. A subtraction from the content of the reversible counter CNT is performed each time the feedback pulse Fp is generated after the generation of the workpiece contact signal WTS. The gripping position arrival signal GPR is produced when the content of the reversible counter is reduced to zero. The flip-flop FF is set by the work contact signal WTS and is reset by the gripping position arrival signal GRP. An AND gate GR is adapted to permit the feedback pulses Fp to be fed to the reversible counter CNT only when the flip-flop FF is set.

In the described embodiments, the robot control system operates in accordance with the workpiece contact signal WTS generated by the sensor attached to the hand. The invention, however, is not limited to this type of sensor and the robot control system of the invention can operate with another type of signal which limits the motion of the robot. In the described embodiment, the hand grips the workpiece after stopping approximately at the gripping position and is then moved to the next command position neglecting the remaining stroke to the gripping position. The operation, however, may be such that the robot does not perform any service at the stopping position or, alternatively, executes another robot service or a special motion program in accordance with the aforementioned signal before it is moved to the next command position. It is also possible to mount the sensor on a stationary part in the vicinity of the path of movement of the hand, instead of mounting the same on the movable part such as the hand.

As has been described, the present invention permits, when applied to a playback type industrial robot which repeatedly performs services on a machine, correct approach of the hand even when the object to be served, e.g. a workpiece, is somewhat offset from the correct position, as well as a gentle and smooth stopping of the hand through deceleration. It is, therefore, possible to achieve the robot service without fail while avoiding any damage to the hand and the workpiece due to momentum, even when the hand has a considerable weight. In addition, the robot which has completed a service at one position can turn to the robot service at the next command position. It is also to be noted that the teaching of the robot control system is facilitated advantageously. According to the invention, therefore, it is possible to substitute robot services for manual work hitherto required for a multiplicity of machine tools and, hence, to achieve a saving of labor and procedure simplification of work.

What is claimed is:

1. A robot control system for moving a robot relative to a workpiece, comprising:
    a robot controller operatively connected to the robot;
    a pulse distributor, operatively connected to said robot controller, for producing distribution pulses;
    a servo circuit operatively connected to said pulse distributor, said robot controller and the robot; and
    a sensor, operatively connected to said pulse distributor, for detecting the position of the robot relative to the workpiece and for generating a deceleration signal when the robot and the workpiece are at a predetermined relative position, said pulse distributor discontinuing the production of distribution pulses when the deceleration signal is generated.

2. A robot control system for moving a robot relative to a workpiece, comprising:
    a robot controller operatively connected to the robot;
    a pulse distributor, operatively connected to said robot controller, for producing distribution pulses;
    a servo circuit operatively connected to said pulse distributor, said robot controller and the robot;
    a sensor for detecting the position the robot relative to the workpiece and for producing a workpiece position signal when the robot and the workpiece are at a predetermined relative position; and
    a gripping position arrival confirmation circuit; operatively connected to said sensor, said pulse distributor and the robot, for generating a deceleration signal at a predetermined time after the workpiece position signal is generated, said pulse distributor discontinuing the production of distribution pulses when the deceleration signal is generated.

3. A robot control system according to claim 2, wherein said robot produces feedback signals and said gripping position arrival confirmation circuit comprises:
    a flip-flop operatively connected to said sensor to receive the workpiece position signal and producing a count signal;
    an AND gate operatively connected to said robot and said flip-flop to receive the feedback pulses and the count signal and producing movement pulses; and
    a counter operatively connected to said pulse distributor and said flip-flop to receive the movement pulses and produce the deceleration signal.

* * * * *

UNITED STATES PATENT AND TRADEMARK OFFICE
CERTIFICATE OF CORRECTION

PATENT NO. : 4,562,551

DATED : December 31, 1985

INVENTOR(S) : HAJIMU INABA ET AL.

It is certified that error appears in the above-identified patent and that said Letters Patent is hereby corrected as shown below:

Col. 2, line 51, delete "is";

line 61, delete "the";

Col. 3, line 31, after "$P_2$" insert --,--;

line 41, "$PD_3$" should be --$PD_3$,--.

Col. 4, line 39, "workpiece" should be --workpieces--.

Col. 8, line 10, after "position" insert --of--.

Signed and Sealed this

Tenth Day of June 1986

[SEAL]

Attest:

DONALD J. QUIGG

Attesting Officer

Commissioner of Patents and Trademarks